United States Patent [19]
Ono

[11] Patent Number: 5,982,906
[45] Date of Patent: Nov. 9, 1999

[54] NOISE SUPPRESSING TRANSMITTER AND NOISE SUPPRESSING METHOD

[75] Inventor: Yoshihiro Ono, Tokyo, Japan

[73] Assignee: NEC Corporation, Tokyo, Japan

[21] Appl. No.: 08/974,659

[22] Filed: Nov. 19, 1997

[30] Foreign Application Priority Data

Nov. 22, 1996 [JP] Japan ..................................... 8-312479

[51] Int. Cl.[6] .................................................. H04B 15/00
[52] U.S. Cl. ......................................... 381/94.2; 381/94.1
[58] Field of Search .......................... 381/66, 94.1, 94.2, 381/93, 71.1, 94.3, 83; 379/410, 406

[56] References Cited

U.S. PATENT DOCUMENTS 5,513,265  4/1996  Hirano ....................................... 381/66
5,644,641  7/1997  Ikeda ...................................... 381/94.1
5,694,474  12/1997  Ngo et al. .................................. 381/66

Primary Examiner—Vivian Chang
Attorney, Agent, or Firm—Laff, Whitesel & Saret, Ltd.; J. Warren Whitesel

[57] ABSTRACT

Signals outputted from microphones 111 and 112 are inputted through filters 118 and 119 to noise suppressing sections A and B. One having smaller power is selected from output signals S107a and S107b by switching a selection switch SW in a signal power comparing section 117, to which the output signals S107a and S107b have been inputted, and a transmission signal S108 level-adjusted by a level adjuster is outputted. In the noise suppressing section A (similarly in the section B), microphone output signals S102 and S103 are processed by an adder 113a and a subtracter 114a, a signal S105a outputted from the subtracter 114a is inputted to a subtracter 116a through a filter 115a having a transmission function Fa(z) decided by the positions of the microphones 111 and 112 and a noise suppression signal S107a obtained by subtracting the signal S105a from a signal S104a outputted from the adder 113a is outputted.

22 Claims, 8 Drawing Sheets

111:MICROPHONE(1)
112:MICROPHONE(2)

NOISE SUPPRESSING TRANSMITTER AND NOISE SUPPRESSING METHOD

BACKGROUND OF THE INVENTION

The present invention relates to a noise suppressing transmitter for outputting transmission signals after ambient noises are suppressed, which is used for a television telephone system or a portable telephone set.

Conventionally, as a hands-free device for a television telephone system, a noise suppressing transmitter for outputting transmission signals after ambient noises have been suppressed has been used. This noise suppressing transmitter has also been used for a portable telephone set. As an example of such a noise suppressing transmitter, one disclosed in JP-A-110349/1987 is known.

FIG. 9 is a circuit diagram showing main constituting portions of a conventional noise suppressing transmitter. In the conventional example of FIG. 9, two microphones 1 and 2 are disposed on a straight line identical to the transmitting direction of a person M. A transmission (output) signal S11 of the microphone 1 is inputted to a subtracter 3, and a transmission (output) signal S12 of the microphone 2 is phase-inverted and then inputted to the subtracter 3. The subtracter 3 extracts a transmission signal and outputs a transmission signal S13 obtained by suppressing ambient noises.

The following problems can be pointed out for the above-noted conventional noise suppressing transmitter.

(1) Distortion occurs in the output transmission signal S13 because of addition of the two signals S11 and S12. For performing such addition based on digital signal processing, the following expression (1) is established, in which the transmission signal S11 of the microphone 1 is represented by $S_1(z)$ and the transmission signal S12 of the microphone S is represented by $S_2(z)$.

Expression 1

$$S_2(z) = S_1(z)D(z) \quad (1)$$

D(z) in the expression (1) represents a transmission function between the two microphones 1 and 2. Based on a difference between the transmission signals S11 and S12 of the two microphones 1 and 2, S(z) of the output transmission signal S13 is represented by the following expression (3).

[Expression 3] (3)

$$S(z) = S_1(z) - S_2(z)$$
$$= S_1(z)(1 - D(z))$$

From the expression (3), the output transmission signal S13 takes a value obtained by multiplying a signal at the time of collecting sounds only by one of the microphones 1 and 2 by the transmission function of 1−D(z). A distance between the two microphones 1 and 2 takes an interval equivalent to one sampling cycle of digital signals. For example, if a sampling frequency is 8 kHz, the distance is 4.35 cm based on the following expression (4), and the output transmission signal S13 is changed to a sound quality after having been passed through a high-pass filter (HPF).

Expression 4

$$1 - D(z) = 1 - z^{-1} \quad (4)$$

(2) For the microphone of an interphone or the like hand-set or fixed in the wall following miniaturization and making thin of a portable telephone set or a cordless telephone set, it is difficult to dispose the two microphones 1 and 2 in the direction of a straight line from a transmission voice source by keeping a proper distance because of structural reasons.

As described above, in the noise suppressing transmitter of the conventional example, distortion occurs in the output transmission signals. In addition, the two microphones cannot be disposed by keeping a proper distance in the direction of a straight line with respect to a transmission direction in the miniaturized and thin device. Consequently, it is impossible to obtain high-quality speech voices in which noises are surely suppressed. In other words, the noise suppressing transmitter of the conventional example is disadvantageous in that it cannot be installed easily in the miniaturized and thin device.

The present invention was made in order to solve the above-described problems-inherent in the prior art. A purpose of the invention to provide a noise suppressing transmitter, which can prevent the occurrence of distortion in output transmission signals, provide high-quality speech voices with noises surely suppressed and be easily installed in a miniaturized and thin device.

SUMMARY OF THE INVENTION

The present invention is made to solve the above-mentioned problems.

The objective of the present invention is achieved by a noise suppressing transmitter for outputting voice signals by suppressing ambient noises, comprising: first and second microphones; first and second noise suppressing means for suppressing noises by performing addition and subtraction for output signals from said first and second microphones; power comparing means for comparing power between output signals from said first and second noise suppressing means; and selecting means for selecting, among said output signals of said first and second noise suppressing means, an output signal having smaller power based on a signal from said power comparing means, and outputting said output signal.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Next, the preferred embodiments of the noise suppressing transmitter of the present invention will be described in detail with reference to the accompanying drawings.

Figure 1:
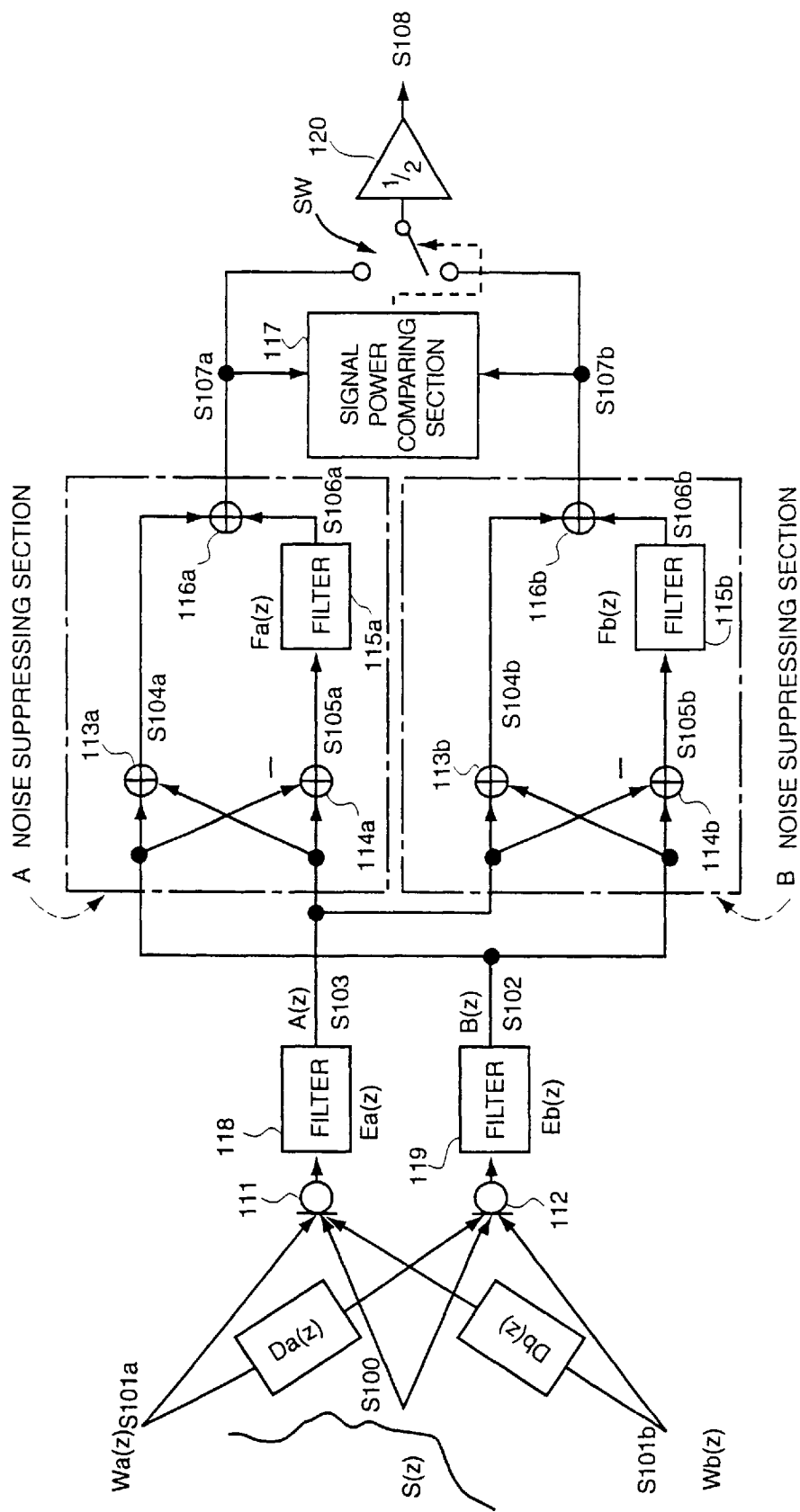
FIG. 1 is a Block diagram showing a constitution of an embodiment of a noise suppressing transmitter of the present invention.

FIG. 1 is a block diagram showing a constitution of a first embodiment of the noise suppressing transmitter of the present invention.

In FIG. 1, a transmitted voice S100 and ambient noises S101a and S101b are inputted to microphones 111 and 112. Signals outputted from these microphones 111 and 112 are inputted to filters 118 and 119 for performing delaying respectively. Microphone output signals S102 and S103 delayed by the filters 118 and 119 are inputted to noise suppressing sections A and B.

Signals S107a and S107b outputted from the noise suppressing sections A and B are inputted to a signal power comparing section 117. In the signal power comparing section 117, a signal having smaller power is selected from the output signals S107a and S107b supplied to a selection switch SW and put through a level adjuster 120, and thereby a transmission signal S108 matching to a ½ level is outputted.

Next, the constitutions of the noise suppressing sections A and B will be described.

The two noise suppressing sections are similarly constructed. The delayed microphone output signals S102 and S103 are respectively inputted to an adder 113a (113B) and a subtracter 114a (114b) in the noise suppressing sections A and B. A signal S105a (S105b) outputted from the subtracter 114a (114b) is inputted to a filter 115a (115b) having a transmission function Fa(z) decided by the positions of the microphones 111 and 112. In a subtracter 116a (116b), the output signal S106a (S106b) of the filter 115a (115b) is subtracted from the output signal S104a (S104b) of the adder 113a (113b) and the result of this subtraction is outputted as a noise suppressed signal S107a (S107b).

Next, the principle of noise suppression will be described by using numerical expressions.

Figure 2:
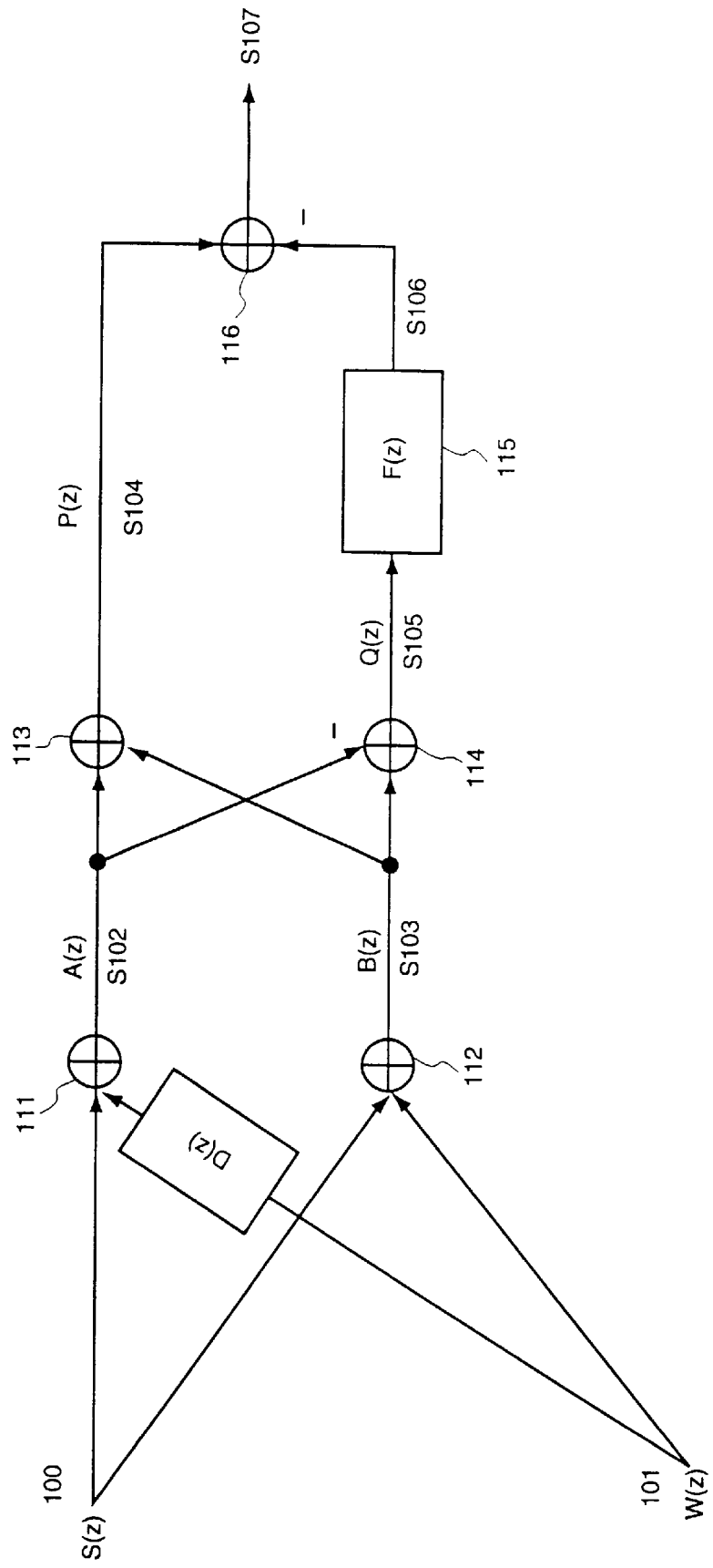
FIG. 2 is a view illustrating a principle of noise suppression of the first embodiment.

FIG. 2 is a view illustrating the principle of noise suppression of the first embodiment shown in FIG. 1.

In FIG. 2, a transmitted voice signal and a noise signal are denoted respectively by codes S(z) and W(z). The two microphones are disposed at equal distances from a transmitted sound source, and it can be understood that transmitted voices reaching the microphones have identical phases. On the other hand, if noise signals come from a direction nearly vertical to the transmitted voices, phase differences occur among the noise signals reaching the microphones. This relationship is represented by a transmission function D(z). Signals S102, A(z) and S103, B(z) outputted from the microphones can be represented by the following expressions (5) and (6).

Expression 5

$$A(z)=S(z)+W(z)D(z) \quad (5)$$

Expression 6

$$B(z)=S(z)+W(z) \quad (6)$$

By performing addition or subtraction for these two output signals S102, A(z) and S103, B(z), a signal A104, P(z) outputted from the adder 113 and a signal S105, Q(z) as a subtraction result outputted from the subtracter 114 are represented by the following expressions (7) and (8).

[Expression 7]

$$P(z) = A(z) + B(z)$$
$$= 2S(z) + W(z)(1 + D(z))$$
(7)

[Expression 8]

$$Q(z) = B(z) - A(z)$$
$$= W(z)(1 - D(z))$$
(8)

From these expressions (7) and (8), the following expression (9) is obtained.

[Expression 9]

$$S(z) = 1/2 \, [P(z) - W(z)(1 + D(z)]$$
$$= 1/2 \, [P(z) - Q(z)(1 + D(z))/(1 - D(z))]$$
(9)

Herein, since a transmission function for Q(z) corresponds to the filter 115, a transmission function F(z) is represented by the following expression (10).

Expression 10

$$F(z)=(1+D(z))/(1-D(z)) \quad (10)$$

From the foregoing description, it can be understood that a transmitted voice can be extracted by suppressing noise signals. For a noise signal W(z), that is, a noise signal entering from an opposite side with the incoming direction of a transmitted sound source as a symmetrical axis, noise suppression is performed by the constitution shown in FIG. 1. Accordingly, by adjusting the transmission function F(z) of the filter 115, noises coming from optional directions can be suppressed. Next, the application of the microphones shown in FIGS. 1 and 2 to a portable telephone set having a hand set will be described.

Figure 3:
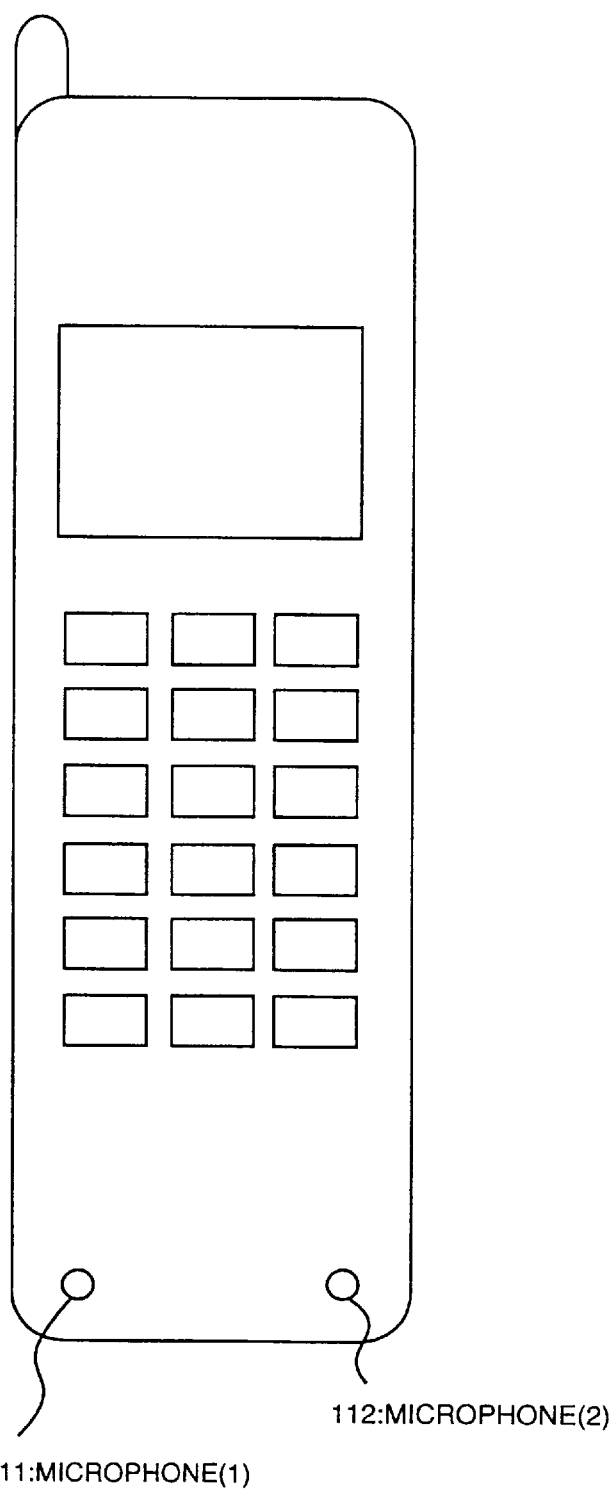
FIG. 3 is a front view showing a constitution of a portable telephone set having a hand set disposed therein in the first embodiment, the hand set using two microphones.
Figure 4:
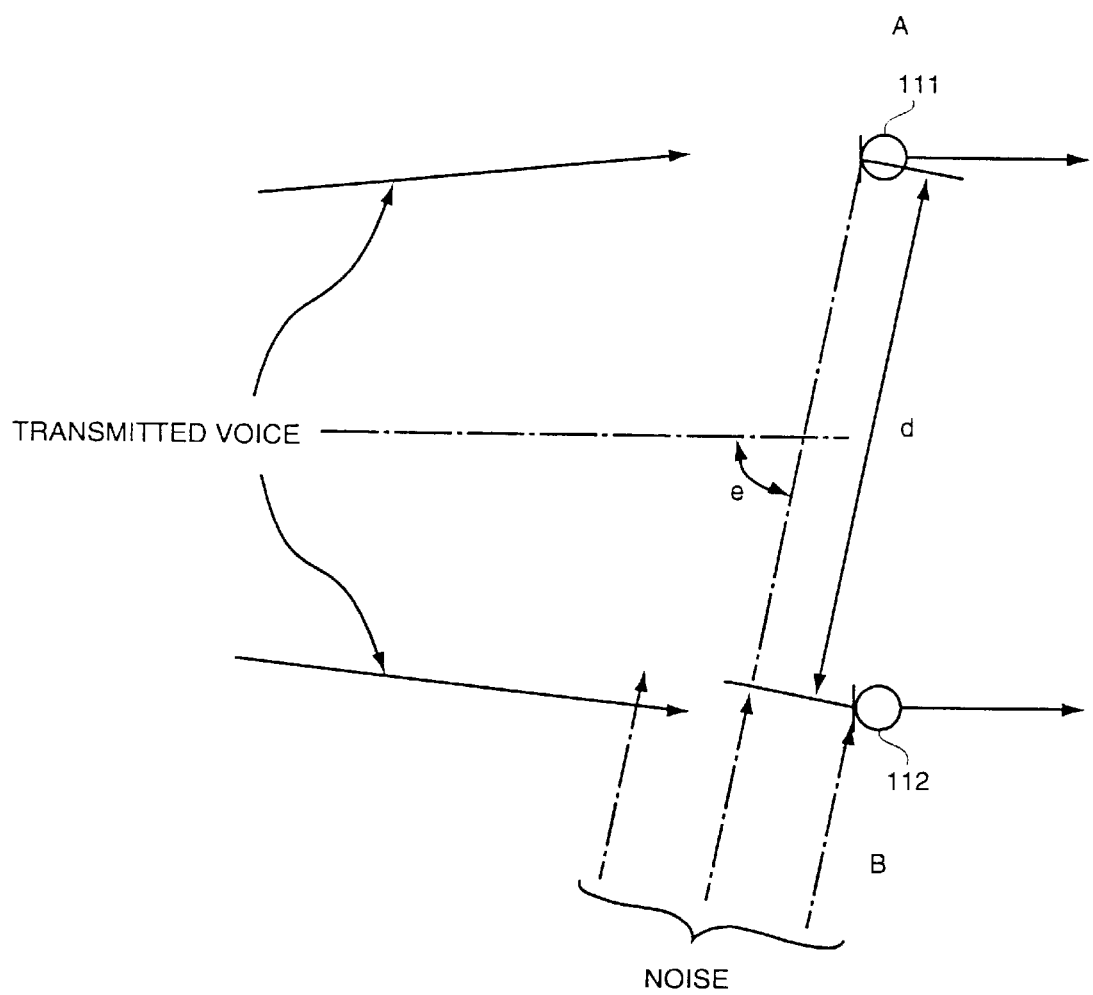
FIG. 4 is a view showing relationships between microphone positions and incoming voices in the first embodiment.

FIG. 3 is a front view showing the constitution of a portable telephone set, in which a hand set using two microphones is disposed, and FIG. 4 is a view showing a relationship between the positions of the microphones and incoming voices.

In FIGS. 3 and 4, since noises come in from sufficiently far places for an interval between two microphones (1) 111 and (2) 112, the incoming directions thereof can be understood to be identical to each other in the hand set.

Therefore, a noise signal inputted to the microphone (1) 111 is delayed by an amount equivalent to a distance (d) compared with a noise signal inputted to the microphone (2) 112. Assuming that a sampling frequency for signal processing is 8 kHz, by selecting a microphone position so as to satisfy d=42.5 mm, a delay is equal to a delay of one sampling cycle. This relationship is represented by the expression (11).

Expression 11

$$Db(z)=z^{-1} \quad (11)$$

Accordingly, a transmission function Fb(z) of the filter 115b is represented by the following expression (12).

$$Fb(z)=(1+z^{-1})/(1-z^{-1}) \quad (12)$$

Herein, since the transmission function Fb(z) may be unstable depending on inputs, the term $z^{-1}$ of the denominator must be multiplied by a coefficient of 0<a<1 in order to compensate for its instability. This relationship is represented by the following expression (13).

Expression 13

$$Fb(z)=(1+z^{-1})/(1-az^{-1}) \qquad (13)$$

However, (a) must be approximated to 1 as much as possible.

Similarly, a transmission function Fa(z) of the filter 115*a* is represented by the following expression (14).

Expression 14

$$Fb(z)=Fa(z)=(1+z^{-1})/(1-az^{-1}) \qquad (14)$$

As a result, noises can be suppressed even if the noises come from any directions inclined by θ degrees with respect to the incoming direction of transmitted voices. Further, if the transmission functions of the filters 115*a* and 115*b* are not identical to each other, microphones having noise suppression characteristics asymmetrical between left and right sides when seen from the transmitted voice incoming direction can be realized.

Expression 14

$$Fb(z)=Fa(z)=(1+z^{-1})/(1-az^{-1}) \qquad (14)$$

As a result, noises can be suppressed even if the noises come from any directions inclined by θ degrees with respect to the incoming direction of transmitted voices. Further, if the transmission functions of the filters 115*a* and 115*b* are not identical to each other, microphones having noise suppression characteristics asymmetrical between left and right sides when seen from the transmitted voice incoming direction can be realized.

Next, the second embodiment will be described.

Figure 5:
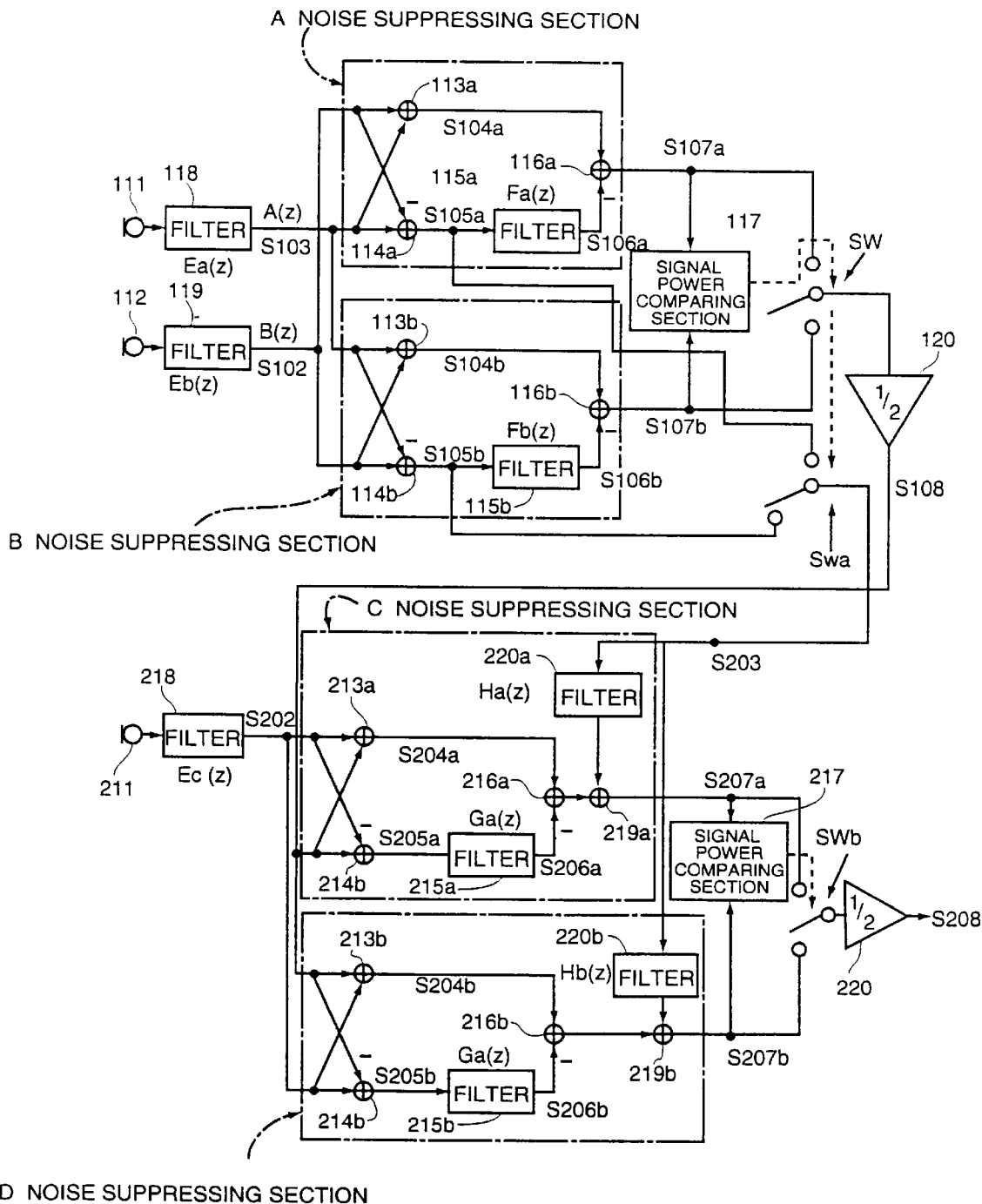
FIG. 5 is a block diagram showing a constitution of a second embodiment.
Figure 6:
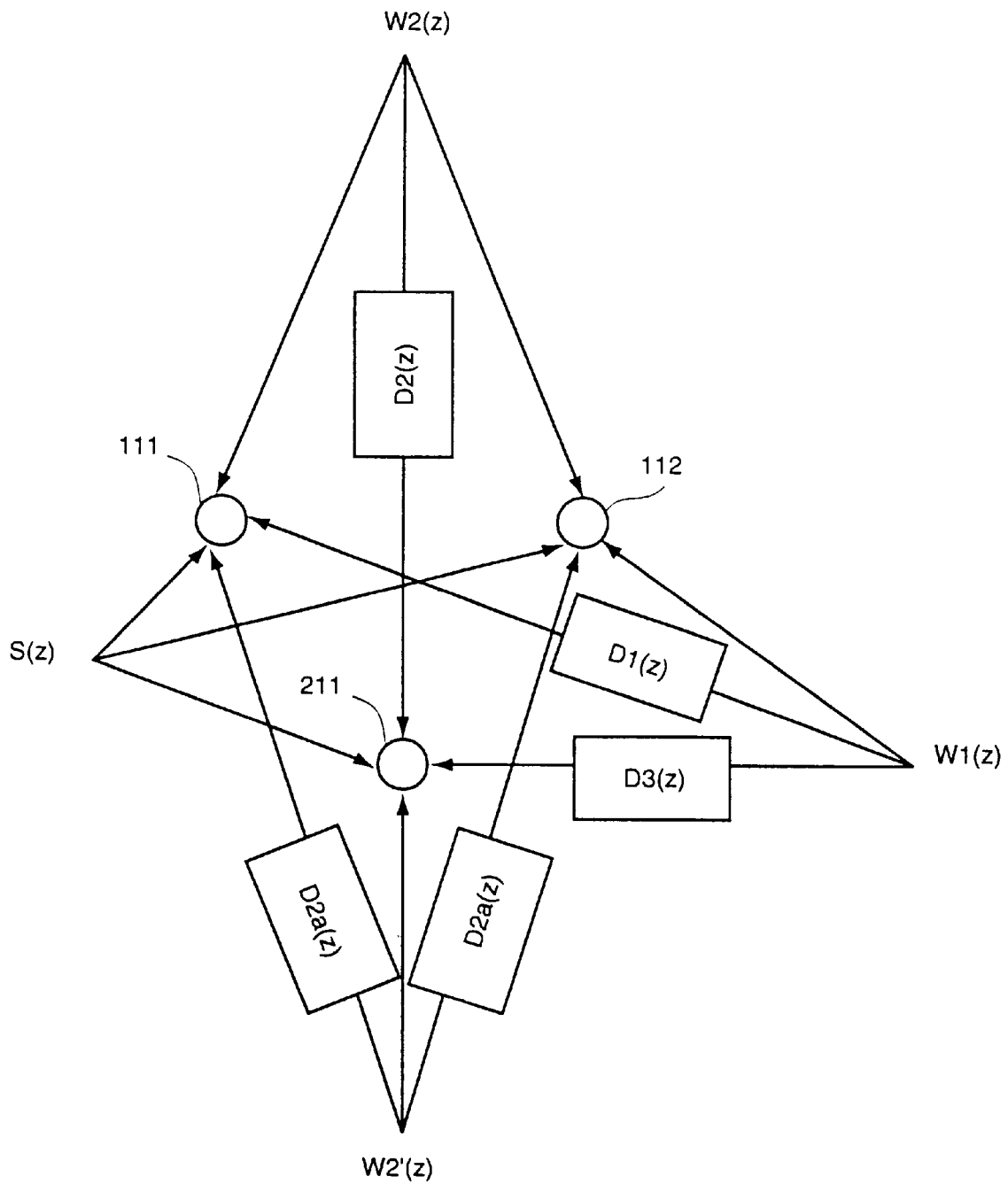
FIG. 6 is a view showing disposition of two microphones in the second embodiment.

FIG. 5 is a block diagram showing the constitution of the second embodiment, and FIG. 6 is a view showing the disposition of the two microphones of the second embodiment.

In FIGS. 5 and 6, it is assumed that a sound source of a transmitted voice S(z) is set at equal distances from respective microphones 111, 112 and 211. A noise W1(z) comes from the direction of an extended straight line for connecting the microphones 111 and 112. A noise W2(z) comes from the direction of an extended straight line for connecting a center point between the microphones 111 and 112 and the microphone 211.

In FIG. 5, processing from the two microphones 111 and 112 to the level adjuster 120 is similar to that of the first embodiment, and thus overlapped descriptions will be omitted. However, in the signal power comparing section 117, an output signal S203 obtained by selecting one of the output signals 105*a* and 105*b* by a selection switch SWa is further outputted.

In this case, if the level of an output signal S107*a* is smaller than that of an output signal S107*b*, the selection switch SWa selects the output signal S105*a*, and this output signal S105*a* is then sent out as an output signal S203. If the level of the output signal S107*b* is smaller, the selection switch SWa selects the output signal S105*b*, and this output signal S105*b* is then sent out as an output signal S203.

A signal outputted from the microphone 211 is inputted to a filter 218. A delayed microphone output signal S202 is inputted to noise suppressing sections C and D. Signals S207*a* and S207*b* outputted from the noise suppressing sections C and D are inputted to a power comparing section 217 and a selection switch SWb. The selection switch SWb selects an output signal having a smaller level from the output signals S207*a* and S207*b* based on a signal outputted from the signal power comparing section 217, and a level adjuster 220 adjusts this signal to a ½ level and then outputs the signal as a transmission signal S208.

Next, the constitutions of the noise suppression sections C and D will be described.

The constitutions of these two noise suppressing sections C and D are similar to each other. The delayed microphone output signal S202 is inputted to an adder 213*a* (subtracter 214*b*). A transmission signal from the level adjuster 120 is inputted to a subtracter 214*a* (adder 213*b*).

A signal S205*a* (S205*b*) outputted from the subtracter 214*a* (214*b*) is inputted to a filter 215*a* (215*b*) having a transmission function Ga(z) decided based on the positions of the microphones. In a subtracter 216*a* (216*b*), a signal S206*a* (S206*b*) outputted from the filter 215*a* (215*b*) is subtracted from a signal S204*a* (S204*b*) outputted from the adder 213*a* (213*b*), and the result of this subtraction is inputted to an adder 219*a* (219*b*).

A signal S203 outputted from the selection switch SWa is subjected to filtering by a filter 220*a* (220*b*), and then inputted to the adder 219*a* (219*b*). A signal outputted from the adder 219*a* (219*b*) is outputted as an output signal 207*a* (207*b*) of the noise suppressing section C (D). Next, the principle of the noise suppression of the second embodiment will be described based on numerical expressions.

In FIG. 6, it is assumed that a transmitted voice signal is denoted by S(z), noise signals are denoted by W1(z) and W2(z) and transmission functions of acoustic passing dependent on the disposition of the three microphones 111, 112 and 211 are represented by D1(z), D1(z) and D1(z) respectively. It is also assumed that noise signals come in vertically with respect to transmitted voices. Processing from the two microphones 111 and 112 to the outputting of a transmission signal S108 is similar to that of the first embodiment, and thus overlapped descriptions will be omitted. A transmission signal S108 is represented by the following expression (15).

Expression 15

$$S(z)+W_2(z) \qquad (15)$$

A signal S202, Aa(z) outputted from the microphone 211 and a transmission signal S108, Ba(z) are respectively represented by the following expressions (16) and (17).

Expression 16

$$Aa(z)=S(z)+W_2(z)D_2(z)+W_1(z)D_3(z) \qquad (16)$$

Expression 17

$$Ba(z)=S(z)+W_2(z) \qquad (17)$$

The output signal S202, Aa(z) and the transmission signal S108, Ba(z) are inputted to the two noise suppressing sections C and D. The noise suppressing sections C and D perform similar operations. The output signal 204*a* (204*b*) obtained by addition and the output signal S205*a* (205*b*) obtained by subtraction are represented by the following expressions (18) and (19).

[Expression 18] (18)

$$Pa(z) = Aa(z) + Ba(z)$$
$$= 2S(z) + W_2(z)(1 + D_2(z)) + W_1(z)D_3(z)$$

-continued

[Expression 19] (19)

$$Q(z) = B(z) - A(z)$$
$$= W_2(z)(1 - D_2(z)) - W_1(z)D_3(z)$$

From these expressions (18) and (19), the following expression (21) is obtained.

[Expression 21] (21)

$$S(z) = 1/2 \, [Pa(z) - (1 + D_2(z))/(1 - D_2(z))Qa(z) - 2/(1 - D_2(z))D_3(z)/(1 - D_1(z))Q(z)]$$

Herein, since transmission functions for $Q(z)$ and $Qa(z)$ correspond to the filters 215$a$ and 220$a$, the following expressions (23) and (24) are obtained.

Expression 23

$$Ga(z) = (1+D_2(z))/(1-D_2(z)) \qquad (23)$$

Expression 24

$$Ha(z) = -2/(1-D_2(z))D_3(z)/(1-D_2(z)) \qquad (24)$$

Similar processing is performed for the noise suppressing section D.

The noise suppressing section C processes a noise $W2(z)$ shown in FIG. 6 so as to suppress the same, and the noise suppressing section D processes a noise $W2a(z)$ shown in FIG. 6 so as to suppress the same. Accordingly, the output signals S207$a$ and S207$b$ of the two noise suppressing sections C and D are compared with each other for power, and the signal having smaller power is outputted via the selection switch SWb and the level adjuster 220. From the foregoing description, it can be understood that a transmitted voice after having suppressed noise signals can be extracted without the occurrence of distortion. In the above description, the incoming direction of noise signals was assumed to be vertical to the transmitted voice, but by adjusting the transmitting functions of the filters 215$a$, 215$b$, 220$a$ and 220$b$, noises of given directions can be suppressed.

Next, the use of the microphones shown in FIGS. 5 and 6 for the hand set of a portable telephone set will be described.

Figure 7:
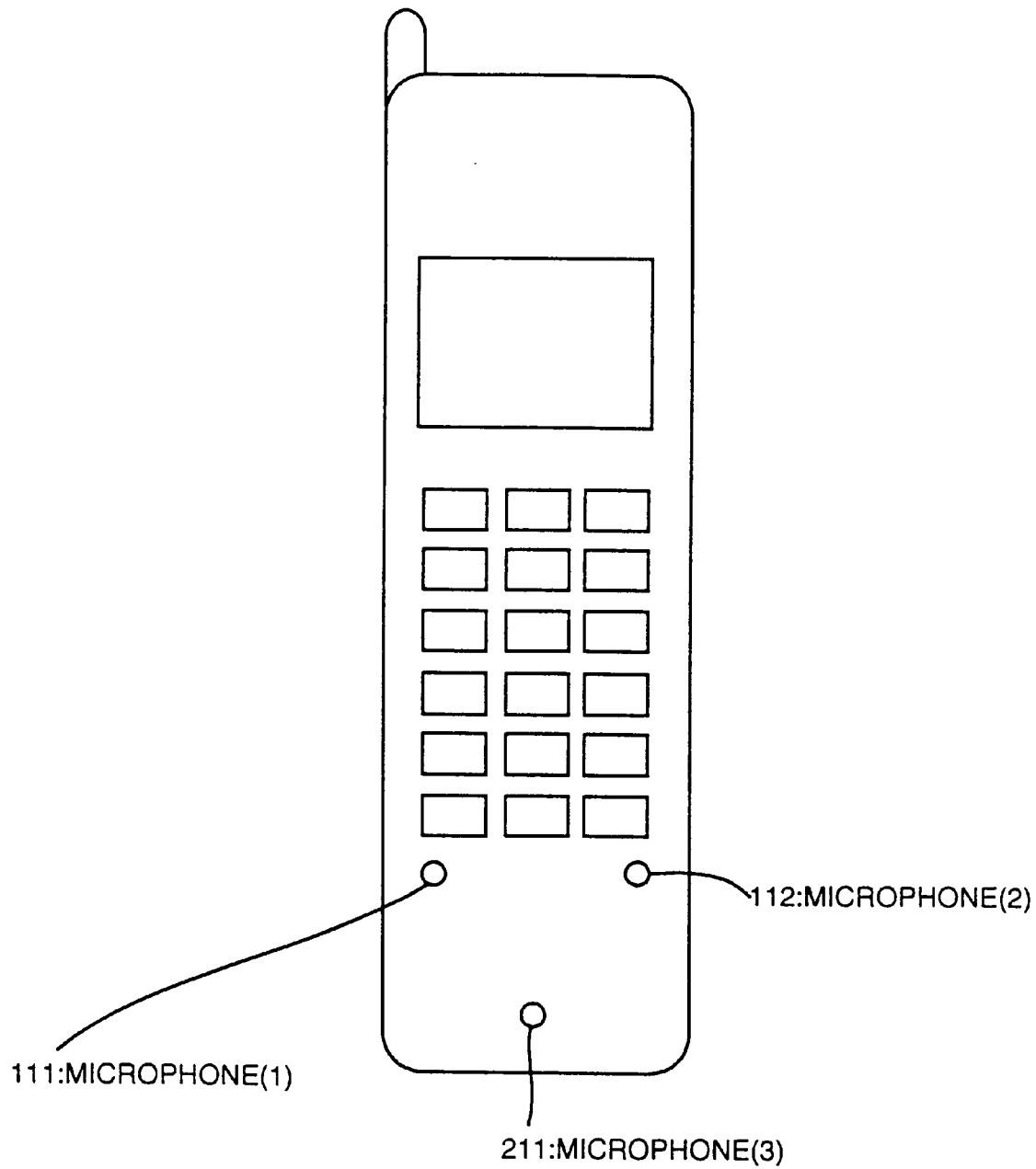
FIG. 7 is a front view showing a constitution of a portable telephone set having a hand set disposed therein in the second embodiment, the hand set using three microphones.
Figure 8:
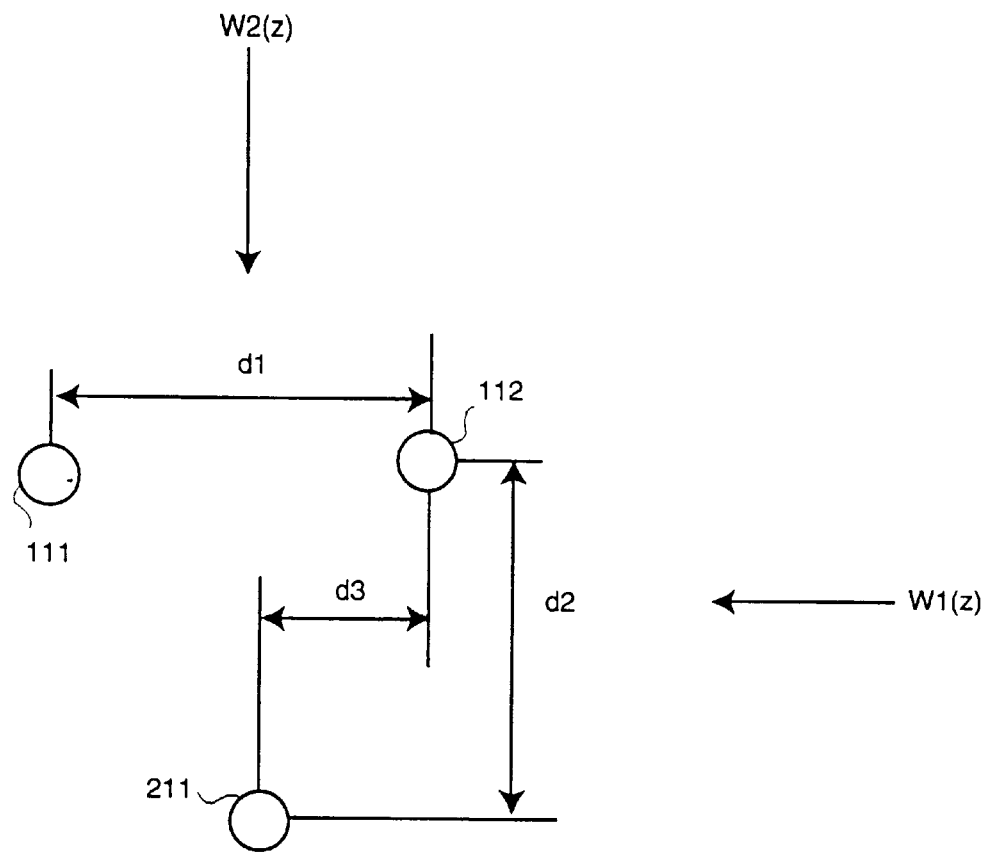
FIG. 8 is a view showing position and distance relationships among the three microphones and relationships thereof with noise incoming directions in the second embodiment.
Figure 9:
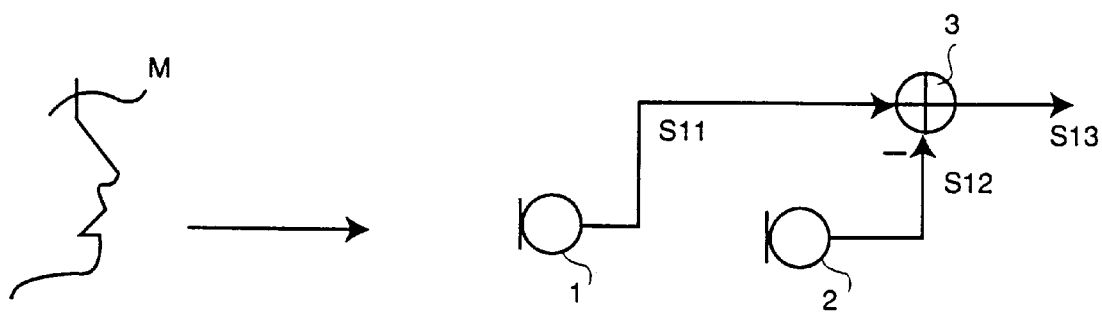
FIG. 9 is a circuit diagram showing a main section constitution of a conventional noise suppressing transmitter.

FIG. 7 is a front view showing the constitution of a portable telephone set, in which a hand set using three microphones is disposed, and FIG. 8 is a view showing the positional and distance relations between the three microphones and the relations thereof with noise incoming directions.

In FIGS. 7 and 8, a transmitted sound source is placed at equal distances from the microphones 111, 112 and 211, and its voice and its incoming direction are assumed to be in a direction penetrating the front of a paper surface to the back. Since two noises $W1(z)$ and $W2(z)$ come in from sufficiently far places for an interval between the two microphones, the incoming directions thereof can be considered to be identical to each other in the hand set.

The noise signal $W1(z)$ inputted to the microphone 111 is delayed by a distance d1 compared with a noise signal inputted to the microphone 112. The noise signal $W1(z)$ inputted to the microphone 211 is delayed by a distance d3 compared with a noise signal inputted to the microphone 112. Further, the noise signal $W2(z)$ inputted to the microphone 211 is delayed by a distance d2 compared with noise signals inputted to the microphones 111 and 112.

Herein, if a sampling frequency for signal processing is 16 kHz, by selecting the positions of the microphones 111, 112 and 211 so as to satisfy d1=d2=42.5 mm and d3=21.25 mm, delays by distances d1 and d2 occur for two sampling cycles, and a delay by a distance d3 occurs for one sampling cycle. These relationships are represented by the following expressions (25) and (26).

[Expression 25] (25)

$$D_1(z) = D_2 = z^{-2}$$

[0064]

[Expression 26] (26)

$$D_3(z) = z^{-1}$$

Accordingly, transmission functions of the filters 115$b$, 215$a$ and 220$a$ are represented respectively by the following expressions (27), (28) and (29).

Expression 27

$$Fb(z)=(1+z^{-2})/(1-Z^{-2}) \qquad (27)$$

Expression 28

$$Ga(z)=(1+Z^{-2})/(1-Z^{-2}) \qquad (28)$$

Expression 29

$$Ha(z)=-2/(1-z^{-2})z^{-1}/(1-z^{-2}) \qquad (29)$$

Then, the term $z^{-2}$ of the denominator is multiplied by a coefficient of 0<a<1 in order to compensate for the instability of each filter. This relationship is represented by each of the following expressions (30), (31) and (32).

Expression 30

$$Fb(z)=(1+z^{-2})/(1-az^{-2}) \qquad (30)$$

Expression 31

$$Ga(z)=(1+z^{-2})/(1-az^{-2}) \qquad (31)$$

Expression 32

$$Ha(z)=-2/(1-az^{-2})z^{-1}/(1-az^{-2}) \qquad (32)$$

However, (a) must be approximated to 1 as much as possible.

Transmission functions of the filters 115$a$, 215$b$ and 220$b$ are similarly decided. Specifically, these transmission functions are represented by the following expressions (33), (34) and (35).

Expression 33

$$Fa(z)=(1+z^{-2})/(1-z^{-2}) \qquad (33)$$

Expression 34

$$Ga(z)=(1+z^{-2})/(1-z^{-2}) \qquad (34)$$

Expression 35

$$Hb(z)=2z^{-2}/(1-z^{-2})z^{-1}/(1-z^{-2}) \qquad (35)$$

As a result, even if noises come in from any directions vertical to the incoming direction of transmitted voices, the noises can be suppressed. If the transmission functions of the filters 115$a$ and 115$b$, the filters 215$a$ and 215$b$ and the filters 220$a$ and 220$b$ are not identical to each other, microphones having noise suppression characteristics can be realized, the noise suppressing characteristics being asymmetrical in upper and lower and left and right sides when seen from the incoming direction of transmitted voices.

Since a transmitted sound source direction can be optionally set based on Ea(z), Eb(z) and Ez(z) immediately after the inputs are made to the microphones, if the microphones cannot be disposed at equal distances from the original sound source direction, the microphones can be installed at equal distances by adjusting the delaying amounts thereof.

As apparent from the foregoing, according to the noise suppressing transmitter of the present invention, the two or three microphones are disposed on the straight line (on the same plane) orthogonal to the transmitted sound source, addition and subtraction are performed for voice signals outputted from the microphones, a signal obtained by filtering the subtracted signal based on the transmission function decided by the disposition of the microphones is subtracted from a signal obtained by addition, and after suppressing noises, an output signal is sent out.

As a result, no distortion occurs in output transmission signal and a high-quality speech voice having noises suppressed can be obtained. In addition, since the two or three microphones are disposed on the same place as the casing, disposing sections are not so thick. In other words, installing of the two or three microphones in a miniaturized and thin device can be facilitated.

The entire disclosure of Japanese Patent Application No. 8-312479 filed on Nov. 22, 1996 including specification, claims, drawing and summary are incorporated herein by reference in its entirety.

What is claimed is:

1. A noise suppressing transmitter for outputting voice signals by suppressing ambient noises, comprising:

first and second microphones;

first and second noise suppressing means for suppressing noises by performing addition and subtraction for output signals from said first and second microphones;

power comparing means for comparing power between output signals from said first and second noise suppressing means; and selecting means for selecting, among said output signals of said first and second noise suppressing means, an output signal having smaller power based on a signal from said power comparing means, and outputting said output signal.

2. The noise suppressing transmitter of claim 1, wherein said first and second microphones are disposed on straight lines orthogonal to transmitted voice sources.

3. The noise suppressing transmitter of claim 1, wherein said first noise suppressing means includes an adder for adding together said output signals from said first and second microphones, a first subtracter for subtracting said output signal of said second microphone from said output signal of said first microphone, a filter for filtering an output signal from said first subtracter based on a transmission function determined by disposition of said first and second microphones and a second subtracter for subtracting an output signal of said filter from an output signal of said adder, and said second noise suppressing means includes an adder for adding together said output signals from said first and second microphones, a first subtracter for subtracting said output signal of said first microphone from said output signal of said second microphone, a filter for filtering an output signal from said subtracter based on a transmission function determined by disposition of said first and second microphones and a second subtracter for subtracting an output signal of said filter from an output signal from said adder.

4. The noise suppressing transmitter of claim 1, further comprising level adjusting means for adjusting a level of an output signal from said selecting means and outputting a level-adjusted signal.

5. The noise suppressing transmitter of claim 1, wherein said first and second microphones are disposed on a plane identical to a plane for a casing of a microphone of a device for performing voice transmission.

6. The noise suppressing transmitter of claim 4, wherein said device for performing voice transmission is at least one of a hands-free device of a television telephone system and a portable telephone set.

7. A noise suppressing transmitter for outputting voice signals by suppressing noises, comprising:

first, second and third microphones;

first and second noise suppressing means for suppressing noises by performing addition and subtraction for output signals of said first and second microphones;

first power comparing means for comparing power between output signals from said first and second noise suppressing means;

first selecting means for selecting, among said output signals of said first and second noise suppressing means, an output signal having smaller power based on a signal from said power comparing means, and outputting said output signal;

third and fourth noise suppressing means for suppressing noises by performing addition and subtraction among an output signal from said third microphone, said output signal of said first selecting means and a signal obtained by subtraction in at least one of said first and second noise suppressing means;

second power comparing means for comparing power between output signals from said third and fourth noise suppressing means; and second selecting means for selecting, among said output signals of said third and fourth noise suppressing means, an output signal having smaller power based on a signal from said second power comparing means, and outputting said output signal.

8. The noise suppressing transmitter of claim 7, wherein said first, second and third microphones are disposed on straight lines orthogonal to transmitted voice sources.

9. The noise suppressing transmitter of claim 7, further comprising level adjusting means for adjusting a level of a signal from one of said first and second selecting means and outputting a level-adjusted signal.

10. The noise suppressing transmitter of claim 7, wherein said first, second and third microphones are disposed on a plane identical to a plane for a casing of a microphone of a device for performing voice transmission.

11. The noise suppressing transmitter of claim 10, wherein said device for performing voice transmission is at least one of a hands-free device of a television telephone system and a portable telephone set.

12. A noise suppressing transmitter for outputting voice signals by suppressing ambient noises, comprising:

first and second microphones disposed on straight lines orthogonal to transmitted voice sources;

first and second noise suppressing means;

power comparing means for comparing power between output signals from said first and second noise suppressing means;

selecting means for selecting, among said output signals of said first and second noise suppressing means, an output signal having smaller power based on a signal from said power comparing means, and outputting said output signal; and level adjusting means for adjusting a level of an output signal from said selecting means and outputting a level-adjusted signal, wherein said first noise suppressing means includes an adder for adding together output signals from said first and second microphones, a first subtracter for subtracting said output signal of said second microphone from said output signal of said first microphone, a filter for filtering an output signal from said first subtracter based on a transmission function determined by disposition of said first and second microphones and a second subtracter for subtracting an output signal of said filter from an output signal of said adder, and said second noise suppressing means includes an adder for adding together said output signals from said first and second microphones, a first subtracter for subtracting said output signal of said first microphone from said output signal of said second microphone, a filter for filtering an output signal from said first subtracter based on a transmission function determined by disposition of said first and second microphones and a second subtracter for subtracting an output signal of said filter from an output signal of said adder.

13. The noise suppressing transmitter of claim 12, wherein said first and second microphones are disposed on a plane identical to a plane for a casing of a microphone of a device for performing voice transmission.

14. The noise suppressing transmitter of claim 13, wherein said device for performing voice transmission is at least one of a hands-free device of a television telephone system and a portable telephone set.

15. A noise suppressing method for outputting voice signals by disposing first and second microphones on straight lines orthogonal to transmitted voice sources and suppressing ambient noises, said noise suppressing means comprising steps of:
producing first and second noise suppressed signals by performing addition and subtraction for output signals from said first and second microphone so as to suppress noises;
comparing power between said first and second noise suppressed signals; and
selecting, among said first and second noise suppressed signals, a signal having smaller power, and outputting said signal.

16. The noise suppressing method of claim 15, wherein said first noise suppressed signal producing step includes adding together said output signals from said first and second microphones, subtracting said output signal of said second microphone from said output signal of said first microphone, filtering a signal obtained by said subtracting based on a transmission function determined by disposition of said first and second microphones and producing a first noise suppressed signal by subtracting said filtered signal from a signal obtained by said adding, and said second noise suppressed signal producing step includes adding together said output signals from said first and second microphones, subtracting said output signal of said first microphone from said output signal of said second microphone, filtering a signal obtained by said subtracting based on a transmission function determined by disposition of said first and second microphones and producing a second noise suppressed signal by subtracting said filtered signal from a signal obtained by said adding.

17. The noise suppressing method of claim 15, further comprising a step of adjusting a level of said signal selected in said selecting step.

18. The noise suppressing method of claim 15, wherein said first and second microphones are disposed on a plane identical to a plane for a casing of a microphone of a device for performing voice transmission.

19. The noise suppressing method of claim 18, said device for performing voice transmission is at least one of a hands-free device of a television telephone system and a portable telephone set.

20. A noise suppressing method for outputting voice signals by disposing first, second and third microphones on straight lines orthogonal to transmitted voice sources and suppressing ambient noises, said noise suppressing method comprising steps of:
producing first and second noise suppressed signals by performing addition and subtraction for output signals from said first and second microphones;
comparing power between said first and second noise suppressed signals;
selecting, among said first and second noise suppressed signals, a signal having smaller power;
producing third and fourth noise suppressed signals by performing addition and subtraction for an output signal from said third microphone, said selected noise suppressed signal and a signal obtained by performing subtraction for said output signals between said first and second microphones;
comparing power between said third and fourth noise suppressed signals; and
selecting, among said third and fourth noise suppressed signals, a signal having smaller power.

21. The noise suppressing method of claim 20, wherein said first, second and third microphones are disposed on a plane identical to a plane for a casing of a microphone of a device for performing voice transmission.

22. The noise suppressing method of claim 20, wherein said device for performing voice transmission is at least one of a hands-free device of a television telephone system and a portable telephone set.

* * * * *